United States Patent [19]
Stebnicki et al.

[11] Patent Number: 5,678,683
[45] Date of Patent: Oct. 21, 1997

[54] CONVEYOR CHAIN WITH SEALED PLUG HINGE PIN RETENTION SYSTEM

[75] Inventors: James C. Stebnicki, Whitefish Bay; Peter J. Ensch, Wauwatosa, both of Wis.

[73] Assignee: Rexnord Corporation, Milwaukee, Wis.

[21] Appl. No.: 596,588

[22] Filed: Feb. 5, 1996

[51] Int. Cl.$^6$ ................................................ B65G 17/06
[52] U.S. Cl. ............................................................ 198/853
[58] Field of Search ................................ 198/850, 852, 198/853

[56] References Cited

U.S. PATENT DOCUMENTS

| | | | |
|---|---|---|---|
| 2,852,129 | 9/1958 | Conner | 198/853 |
| 4,709,807 | 12/1987 | Poerink | 198/853 |
| 4,858,753 | 8/1989 | Hodlewsky | 198/853 |
| 4,972,942 | 11/1990 | Faulkner | 198/853 |
| 4,993,544 | 2/1991 | Bailey et al. | 198/834 |
| 5,020,656 | 6/1991 | Faulkner | 198/494 |
| 5,096,053 | 3/1992 | Hodlewsky | 198/853 |
| 5,335,768 | 8/1994 | Schladweiler | 198/853 |
| 5,339,946 | 8/1994 | Faulkner et al. | 198/853 X |

FOREIGN PATENT DOCUMENTS

| | | | |
|---|---|---|---|
| 0459691 | 12/1991 | European Pat. Off. | 198/853 |
| 0482729 | 4/1992 | European Pat. Off. | 198/853 |
| 0521506 | 1/1993 | European Pat. Off. | 198/853 |
| 3241632 C2 | 9/1986 | Germany . | |
| 3913077 A1 | 11/1989 | Germany . | |

*Primary Examiner*—James R. Bidwell
*Attorney, Agent, or Firm*—Michael, Best & Friedrich

[57] ABSTRACT

Disclosed herein is a conveyor comprising a first conveyor element including an end comprising a first series of eyes spaced from each other to define therebetween a series of spaces, having therein respective openings axially aligned with each other, and including an end eye, a second conveyor element including an end comprising a second series of eyes which are spaced from each other to define therebetween a series of spaces receiving the eyes of the first conveyor element, which extend into the spaces between the eyes of the first conveyor element, and which have therein respective openings axially aligned with respect to each other and axially aligned with respect to the openings of the eyes of the first conveyor element, a cylindrical hinge pin extending in the openings of the eyes of the first and second conveyor elements and including an end located adjacent the end eye of the first conveyor element, a plug fixed in the opening of the end eye of the first conveyor element and including an end in axial adjacent relation to the end of the hinge pin, and a membrane on one of the plug and the end eye of the first conveyor element for providing a seal between the plug and the end eye of the first conveyor element.

10 Claims, 2 Drawing Sheets

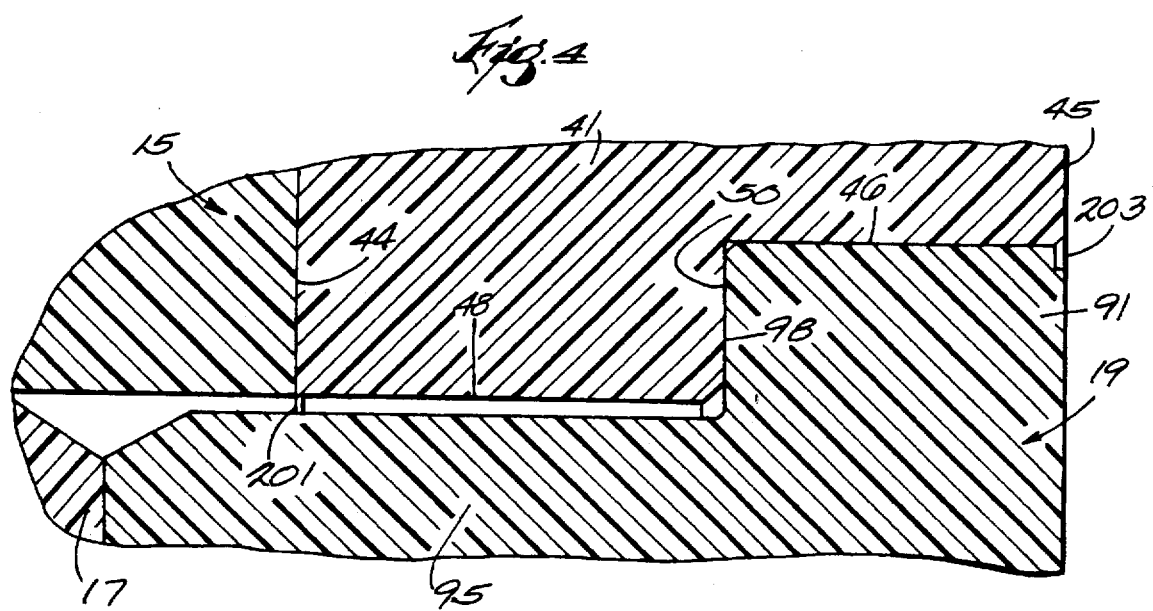

5,678,683

CONVEYOR CHAIN WITH SEALED PLUG HINGE PIN RETENTION SYSTEM

BACKGROUND OF THE INVENTION

The invention relates generally to belts, chains, or conveyors including a plurality of chain links or conveyor elements connected by a succession of hinge pins. In the past, the axial loads on a hinge pin in a conveyor chain or belt were such as to encourage axial hinge pin migration out of or from its connecting function.

More particularly, the invention relates to arrangements for retaining conveyor hinge pins against axial migration. In the past, end plugs were retained in the links or conveyor elements by cantilever style barbed ends which were snap fitted into the openings in the end eyes of one of the connected links or elements so as thereby to releaseably prevent axial removal of the end plugs and to consequentially prevent axial hinge pin migration when such end plugs were assembled to the associated link or conveyor element. Such snap fitting permitted end plug removal to an enable cleaning of the end plug and of the link joint or connection.

Attention is directed to the following U.S. Pat. Nos.:

4,709,807, issued Sep. 5, 1986

4,858,753, issued Aug. 22, 1989

4,972,942, issued Nov. 27, 1990

4,993,544, issued Feb. 19, 1991

5,020,656, issued Jun. 4, 1991

5,335,768, issued Mar. 12, 1993

Attention is also directed to the following German Patents:

DE 3241632 C2

DE 3913077 A1

SUMMARY OF THE INVENTION

The invention provides a conveyor comprising a first conveyor element including an end comprising a first series of eyes spaced from each other to define therebetween a series of spaces, having therein respective openings axially aligned with each other, and including an end eye, a second conveyor element including an end comprising a second series of eyes which are spaced from each other to define therebetween a series of spaces receiving the eyes of the first conveyor element, which extend into the spaces between the eyes of the first conveyor element, and which have therein respective openings axially aligned with respect to each other and axially aligned with respect to the openings of the eyes of the first conveyor element, a cylindrical hinge pin extending in the openings of the eyes of the first and second conveyor elements and including an end located adjacent the end eye of the first conveyor element, a plug fixed in the opening of the end eye of the first conveyor element and including an end in axial adjacent relation to the end of the hinge pin, and means on one of the plug and the end eye of the first conveyor element for providing a seal between the plug and the end eye of the first conveyor element.

The invention also provides a conveyor comprising a first conveyor element including an end comprising a first series of eyes spaced from each other to define therebetween a series of spaces and including a sub-series of centrally located eyes respectively including therein openings having a given diametric dimension and being axially aligned with respect to each other, a first end eye adjacently spaced from the sub-series of centrally located eyes and including therein an opening located in axial alignment with the openings of the sub-series of centrally located eyes, and a second end eye adjacently spaced from the sub-series of centrally located eyes and including therein an opening located in axial alignment with the openings of the sub-series of centrally located eyes, a second conveyor element including an end comprising a series of eyes spaced from each other to define therebetween a series of spaces receiving the eyes of the first conveyor element, extending into the spaces between the eyes of the first conveyor element, and having therein respective openings axially aligned with respect to each other and axially aligned with respect to the openings of the eyes of the first conveyor element, the openings having a diametric dimension substantially equal to the diametric dimension of the openings of the sub-series of centrally located eyes of the first conveyor element, and a cylindrical hinge pin including a central portion extending in the openings of the sub-series of centrally located eyes of the first conveyor element and in the openings of the eyes of the second conveyor element and having a diametric dimension slightly less than the diametric dimension of the openings of the first and second conveyor elements, a first end located adjacent the first end eye of the first conveyor element, and a second end located adjacent the second end eye of the first conveyor element, a first plug fixed in the opening of the first end eye of the first conveyor element and including an end in axial adjacent relation to the first end of the hinge pin, means on one of the first plug and the first end eye of the first conveyor element for providing a seal between the first plug and the first end eye of the first conveyor element, a second plug fixed in the opening of the second end eye of the first conveyor element and including an end in axial adjacent relation to the second end of the hinge pin, and means on one of the second plug and the second end eye of the first conveyor element for providing a seal between the second plug and the second end eye of the first conveyor element.

Other features and advantages of the invention will become apparent to those skilled in the art upon review of the following detailed description, claims and drawings.

DESCRIPTION OF THE DRAWINGS

FIG. 4 is a view which is similar to FIG. 3 and which illustrates another embodiment of the invention Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 1:
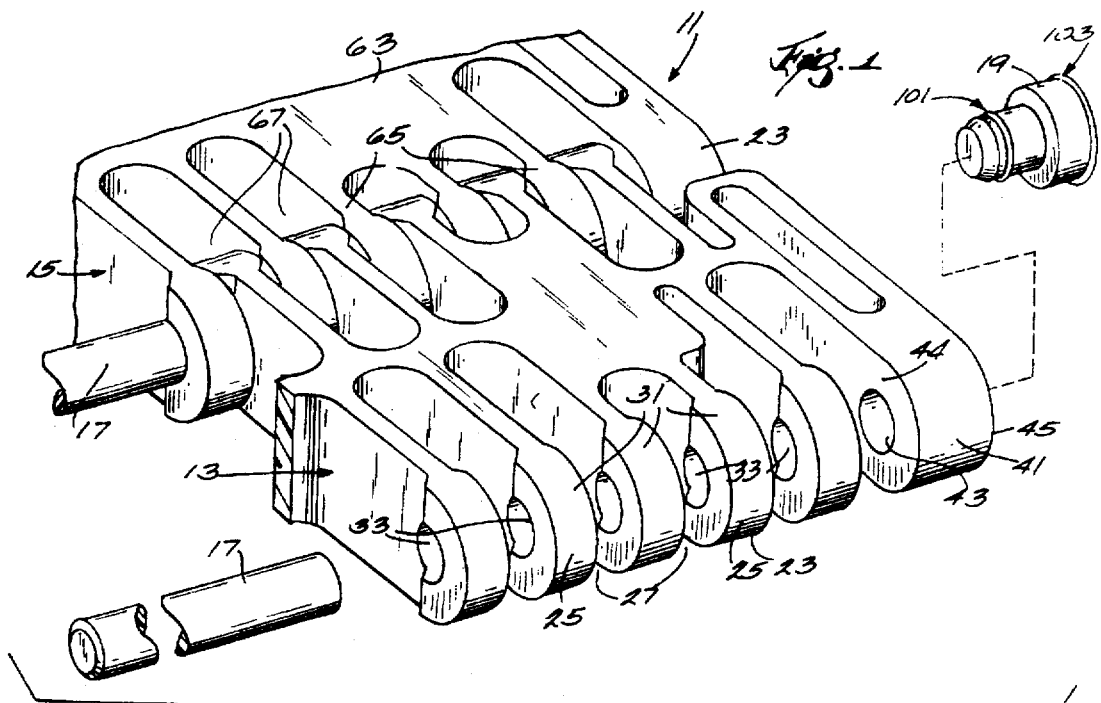
FIG. 1 is an exploded fragmentary perspective view of a belt, track, chain, or conveyor including various of the features of the invention.
Figure 2:
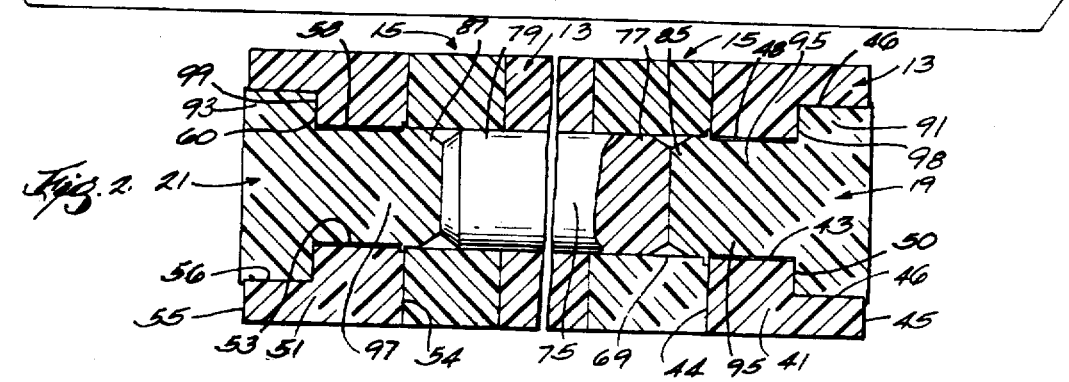
FIG. 2 is a broken-away enlarged view, in section, of a portion of the construction shown in FIG. 1.
Figure 3:
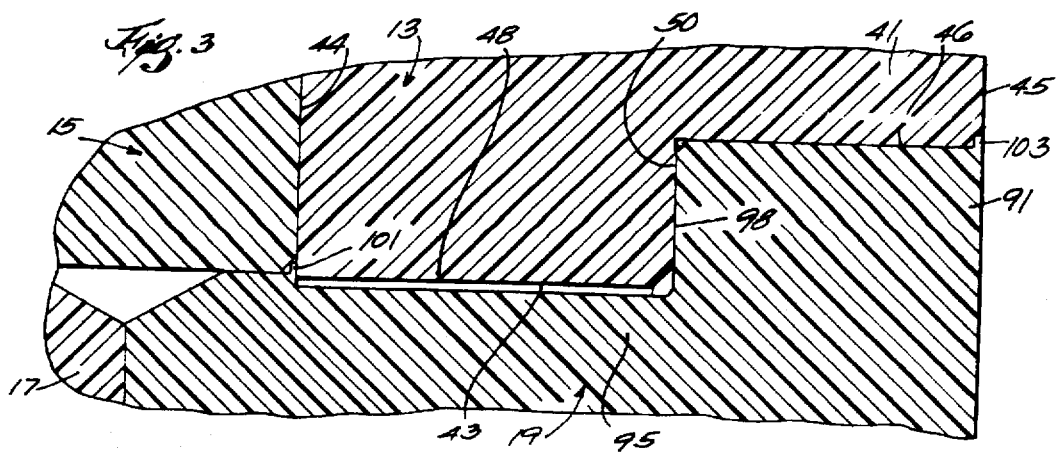
FIG. 3 is a further enlarged view, in section, of a portion of the construction shown in FIG. 2.

Shown in FIG. 1 is one embodiment of a belt, track, chain, or conveyor 11 which embodies various of the features of the invention and which includes first and second conveyor elements 13 and 15, respectively, a hinge pin 17 connecting the first and second conveyor elements 13 and 15, and first and second end plugs 19 and (see FIG. 2) 21, respectively, which are fixed in the first conveyor element 13 and which prevent axial migration of the hinge pin 17 and, at the same time, seal out dirt from entering between the first conveyor element 13 and the end plugs 19 and 21. The invention is applicable to any type of track assembly or conveyor, and, except as noted hereinafter, the conveyor elements can take any conventional form and can be fabricated of any suitable material.

The first conveyor element 13 can be fabricated of any suitable substantially rigid material, such as thermoplastic material, and includes an end 23 comprising a series of eyes 25 transversely spaced from each other to define therebetween a series of spaces 27. The series of eyes 25 includes a sub-series of centrally located eyes 31 respectively including therein openings or bores 33 having a given diametric dimension, and being axially aligned with respect to each other, as well as a first end eye 41 adjacently spaced transversely from one end of the other end of the sub-series of centrally located eyes 31 and including therein an opening or bore 43 located in axial alignment or registry with the openings 33 of the sub-series of centrally located eyes 31, and a second end eye 51 adjacently spaced from the other end of the sub-series of centrally located eyes 31 and including therein an opening or bore 53 located in axial alignment with the openings or bores 33 of the sub-series of centrally located eyes 31.

The end eyes 41 and 51 respectively also include inner surfaces 44 and 54 located adjacent the sub-series of centrally located eyes 31, and outer surfaces 45 and 55 which are located remotely from the sub-series of centrally located eyes 31 and which constitute portions of generally rectilinearly extending and laterally spaced sides of the conveyor 11.

The openings or bores 33 of the sub-series of centrally located eyes 31 can be cylindrical or can be elongated in the direction of travel of the conveyor 11 with an end of the opening or bore 33, in the direction of conveyor travel, being of semi-cylindrical shape. The openings or bores 43 and 53 in the end eyes 41 and 51 are cylindrical and can be of the same diameter as, or of somewhat larger diameter than, the diameter of the openings or bores 33 in the sub-series of centrally located eyes 31.

While other constructions can be employed, in the disclosed construction, the openings or bores 43 and 53 in the end eyes 41 and 51 respectively includes axially outer cylindrical portions 46 and 56 having diameters, and axially inner cylindrical portions 48 and 58 having diameters less than the diameters of the outer cylindrical portions 46 and 56. The openings or bores 43 and 53 also respectively include shoulders 50 and 60 extending between the outer cylindrical portions 46 and 56 and the inner cylindrical portions 48 and 58 of the end plugs 19 and 21.

The second conveyor element 15 can be fabricated of any suitable substantially rigid material and includes an end 63 comprising a series of eyes 65 axially spaced from each other to define therebetween a series of spaces 67 receiving the centrally located eyes 31 of the adjacent first conveyor element 13. The eyes 65 extend into the spaces 27 between the eyes of the adjacent first conveyor element 13 and have therein respective openings or bores 69 axially aligned with respect to each other and axially aligned with respect to the openings or bores of the eyes of the adjacent first conveyor element 13. The openings or bores 69 can be cylindrical or can be elongated in the direction of conveyor travel, with an end of the opening or bore, in the direction of conveyor travel, being of semi-cylindrical shape and having a diametric dimension substantially equal to the diametric dimension of the openings or bores 33 of the sub-series of centrally located eyes 31 of the first conveyor element 13.

The hinge pin 17 can be fabricated of any suitable substantially rigid material, such as thermoplastic or steel, is cylindrical in shape, and includes a central portion 75 extending in the openings or bores 33 of the sub-series of centrally located eyes 31 of the first conveyor element 13 and in the openings or bores 69 of the eyes 65 of the second conveyor element 15 and having a diametric dimension slightly less than the diametric dimension of the openings or bores of the first and second conveyor elements 13 and 15. In addition, the hinge pin 17 includes a first end 77 located adjacent the first end eye 41 of the first conveyor element 13, and a second end 79 located adjacent the second end eye 51 of the first conveyor element 13.

The first and second end plugs 19 and 21 are preferably fabricated from thermoplastic material, although other suitable material could be employed, are generally identical in shape, and are respectively fixed in the openings or bores 43 and 53 of the first and second end eyes 41 and 51 of the first conveyor element 13. The first and second end plugs 19 and 21 respectively include ends 85 and 87 respectively located in axial adjacent relation to the first and second ends 77 and 79 of the hinge pin 17. While other constructions can be employed, in the disclosed construction, the first and second end plugs 19 and 21 also respectively include first or axially outer cylindrical portions 91 and 93 having diameters which are slightly larger than the diameters of the outer cylindrical portions 46 and 56 of the openings or bores 43 and 53 in the end eyes 41 and 51, thus providing press fits when the first and second end plug 19 and 21 are respectively assembled into the end eyes 41 and 51.

The first and second end plugs 19 and 21 also respectively include second or axially inner cylindrical portions 95 and 97 having diameters slightly less than the diameters of the inner cylindrical portions 48 and 58 of the openings 43 and 53 of the first and second end eyes 41 and 51.

In addition, the end plugs 19 and 21 respectively include shoulders 98 and 99 extending from the first cylindrical portions 91 and 93 to the second cylindrical portions 95 and 97, and being in engagement with the shoulders 50 and 60 of the first and second end eyes 41 and 51.

Means are also provided on one of the first end plug 19 and the first end eye 41 of the first conveyor element 13 and on one of the second end plug 21 and the second end eye 51 of the first conveyor element 13 for respectively providing seals between the first and second end plugs 19 and 21 and the first and second end eyes 41 and 51 of the first conveyor element 13.

While other constructions can be employed, in the disclosed construction, the seal providing means comprises, for each associated end plug and end eye, a first or axially inner and radially outwardly extending resilient membrane 101 extending from or fixed to the associated one of the end plugs 41 and 51 adjacent the axially inner end surfaces 44 and 54, and engaging the associated one of the end eyes, and a second or axially outer and radially outwardly extending resilient membrane 103 extending from or fixed to the associated one of the end plugs 19 and 21 adjacent the axially outer end surfaces 45 and 55, and engaging the associated one of the end eyes 41 and 51. In the specifically disclosed construction, the membranes 101 and 103 are integral with and extend from the associated one of the end plugs 19 and 21 adjacent both the outer end surfaces 45 and 55 and the inner end surfaces 44 and 54. At least some of the advantages of the invention can be achieved when only one of the inner and outer seals or membranes 101 and 103 are employed.

The membranes 101 and 103 can be obtained by not removing the usual flash which normally occurs incident to molding in the area where adjacent dies meet. If desired, the edge surfaces of adjacent dies can be ground away to facilitate or promote inherent formation of a flash which can be employed as the membrane.

The press fits between the end eyes 41 and 51 and the end plugs 19 and 21 serve both to hold the end plugs 19 and 21 in place, thereby to prevent axial migration of the hinge pin 17, and to create a seal preventing bacteria from contaminating the chain. More specifically, when the end plugs 19 and 21 are installed in the end eyes 41 and 51, the end plugs 19 and 21 completely encompass the bores 43 and 53 in the end eyes 19 and 21. Furthermore, the membranes 101 and 103 provide a hermetic seal at the axial or lateral ends of the end plugs 19 and 21 to ensure that no bacteria will contaminate the plug area.

In an alternate construction shown in FIG. 4, the seal providing means can comprise resilient membranes 201 and 203 integrally extending from or fixed to the end eyes 41 and 51 adjacent either or both of the inner surfaces 44 and 54 and the outer surfaces 45 and 55 and engaging the associated one of the end plugs 19 and 21.

In the disclosed construction, the press fits of the end plugs 19 and 21 in the openings or bores 43 and 53 in the end eyes 41 and 51 and the seals obtained between the end plugs 19 and 21 and the end eyes 41 and 51 by use of the membranes 101 and 103 in the joint or connection or press fit between the end plugs 19 and 21 and the end eyes 41 and 51 prevent contamination of the plug area, i.e., in the joint or connection between the end plugs 19 and 21 and the end eyes 41 and 43, and thereby avoid any need for cleansing thereof or disassembly.

Various of the features are set forth in the following claims.

We claim:

1. A conveyor comprising a first conveyor element including an end comprising a first series of eyes spaced from each other to define therebetween a series of spaces and having therein respective openings axially aligned with each other, and an end eye having therein an opening axially aligned with said openings in said first series of eyes, a second conveyor element including an end comprising a second series of eyes which are spaced from each other to define therebetween a series of spaces receiving said eyes of said first conveyor element, which extend into said spaces between said eyes of said first conveyor element, and which have therein respective openings axially aligned with respect to each other and axially alignable with respect to said openings of said eyes of said first conveyor element, a cylindrical hinge pin extending in said openings of said eyes of said first and second conveyor elements and including an end located adjacent said end eye of said first conveyor element, a plug fixed in said opening of said end eye of said first conveyor element and including an end in axial adjacent relation to said end of said hinge pin, and a resilient membrane fixed to one of said plug and said end eye of said first conveyor element and extending continuously therearound for providing a seal between said plug and said end eye of said first conveyor element.

2. A conveyor in accordance with claim 1 wherein said opening of said end eye includes an outer portion having a diameter, and an inner portion having a diameter less than said diameter of said outer portion, and wherein said plug includes a first cylindrical portion having a diameter and being press fitted into said outer portion of said opening of said first end eye, and a second cylindrical portion having a diameter less than said diameter of said inner portion of opening of said end eye.

3. A conveyor in accordance with claim 2 wherein said end eye includes a shoulder extending between said inner portion and outer portions of said opening, and wherein said plug includes a shoulder extending between said first and second cylindrical portions and in engagement with said shoulder of said end eye.

4. A conveyor in accordance with claim 1 wherein said means for providing a seal comprises a resilient membrane fixed to said plug and engaging said end eye.

5. A conveyor comprising a first conveyor element including an end comprising a first series of eyes spaced from each other to define therebetween a series of spaces and having therein respective openings axially aligned with each other, and an end eye having therein an opening axially aligned with said openings in said first series of eyes and defined by an annular surface, a second conveyor element including an end comprising a second series of eyes which are spaced from each other to define therebetween a series of spaces receiving said eyes of said first conveyor element, which extend into said spaces between said eyes of said first conveyor element, and which have therein respective openings axially aligned with respect to each other and axially alignable with respect to said openings of said eyes of said first conveyor element, a cylindrical hinge pin extending in said openings of said eyes of said first and second conveyor elements and including an end located adjacent said end eye of said first conveyor element, a plug fixed in said opening of said end eye of said first conveyor element and including an end in axial adjacent relation to said end of said hinge pin, and a resilient membrane fixed to said end eye and engaging said plug to provide a seal between said plug and said end eye of said first conveyor element and extending continuously around said annular surface of said opening in said end eye.

6. A conveyor in accordance with claim 5 wherein said end plug and said membrane comprise one-piece and wherein said membrane extends integrally from said end plug.

7. A conveyor comprising a first conveyor element including an end comprising a first series of eyes spaced from each other to define therebetween a series of spaces, having therein respective openings axially aligned with each other, and an end eye including an opening therein axially aligned with said openings in said first series of eyes and defined by an annular surface, an inner surface, and an outer surface, a second conveyor element including an end comprising a second series of eyes which are spaced from each other to define therebetween a series of spaces receiving said eyes of said first conveyor element, which extend into said spaces between said eyes of said first conveyor element, and which have therein respective openings axially aligned with respect to each other and axially alignable with respect to said openings of said eyes of said first conveyor element, a cylindrical hinge pin extending in said openings of said eyes of said first and second conveyor elements and including an end located adjacent said end eye of said first conveyor element, a plug fixed in said opening of said end eye of said first conveyor element and including an end in axial adjacent relation to said end of said hinge pin, and means on one of said plug and said end eye of said first conveyor element for providing a seal located adjacent said outer surface of said end eye of said first conveyor element and between said plug and said end eye of said first conveyor element, and means on one of said plug and said eye of said first conveyor element for providing a second seal located adjacent said inner surface of said end eye of said first conveyor element and between said plug and said end eye of said first conveyor element.

8. A conveyor in accordance with claim 7 wherein said first mentioned and second seals extend integrally from said end plug.

9. A conveyor in accordance with claim 1 wherein said end plug is fabricated of thermoplastic material.

10. A conveyor comprising a first conveyor element including an end comprising a first series of eyes spaced from each other to define therebetween a series of spaces, and including a sub-series of centrally located eyes respectively including therein openings having a given diametric dimension, and being axially aligned with respect to each other, a first end eye adjacently spaced from said sub-series of centrally located eyes and including therein an opening located in axial alignment with said openings of said sub-series of centrally located eyes, and a second end eye adjacently spaced from said sub-series of centrally located eyes and including therein an opening located in axial alignment with said openings of said sub-series of centrally located eyes, a second conveyor element including an end comprising a series of eyes spaced from each other to define there between a series of spaces receiving said eyes of said first conveyor element, extending into said spaces between said eyes of said first conveyor element, and having therein respective openings axially aligned with respect to each other and axially alignable with respect to said openings of said eyes of said first conveyor element, said openings having a diametric dimension substantially equal to said diametric dimension of said openings of said sub-series of centrally located eyes of said first conveyor element, a cylindrical hinge pin including a central portion extending in said openings of said sub-series of centrally located eyes of said first conveyor element and in said openings of said eyes of said second conveyor element and having a diametric dimension slightly less than said diametric dimension of said openings of said first and second conveyor elements, a first end located adjacent said first end eye of said first conveyor element, and a second end located adjacent said second end eye of said first conveyor element, a first plug fixed in said opening of said first end eye of said first conveyor element and including an end in axial adjacent relation to said first end of said hinge pin, a first resilient membrane fixed to one of said first plug and said first end eye of said first conveyor element and extending continuously therearound for providing a seal between said first plug and said first end eye of said first conveyor element, a second plug fixed in said opening of said second end eye of said first conveyor element and including an end in axial adjacent relation to said second end of said hinge pin, and a second resilient membrane fixed to one of said second plug and said second end eye of said first conveyor element and extending continuously therearound for providing a seal between said second plug and said second end eye of said first conveyor element.

* * * * *